US008803868B2

(12) United States Patent
Ferren et al.

(10) Patent No.: US 8,803,868 B2
(45) Date of Patent: *Aug. 12, 2014

(54) POWER CONSERVATION FOR MOBILE DEVICE DISPLAYS

(71) Applicants: Bran Ferren, Glendale, CA (US); Prashant Gandhi, Gilroy, CA (US); Ajaya Durg, Bangalore (IN); Qingfeng Li, Hillsboro, OR (US); Lakshman Krishnamurthy, Portland, OR (US)

(72) Inventors: Bran Ferren, Glendale, CA (US); Prashant Gandhi, Gilroy, CA (US); Ajaya Durg, Bangalore (IN); Qingfeng Li, Hillsboro, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,977

(22) Filed: Feb. 19, 2013

(65) Prior Publication Data

US 2013/0157646 A1    Jun. 20, 2013

Related U.S. Application Data

(63) Continuation of application No. 12/646,730, filed on Dec. 23, 2009, now Pat. No. 8,446,398.

(60) Provisional application No. 61/187,520, filed on Jun. 16, 2009.

(51) Int. Cl.
G09G 5/00    (2006.01)

(52) U.S. Cl.
USPC .......................... 345/211; 345/690; 345/102

(58) Field of Classification Search
USPC ................ 345/44–52, 82, 83, 102, 204–215, 345/690–697
See application file for complete search history.

(56) References Cited

U.S. PATENT DOCUMENTS

| 6,240,521 | B1 * | 5/2001 | Barber et al. .................. 713/323 |
| 6,272,545 | B1 | 8/2001 | Flanagin et al. |
| 6,282,508 | B1 | 8/2001 | Kimura et al. |
| 6,530,083 | B1 | 3/2003 | Liebenow |
| 6,603,469 | B1 * | 8/2003 | Gettemy et al. .............. 345/211 |
| 6,633,274 | B1 | 10/2003 | Yokota et al. |
| 6,753,842 | B1 * | 6/2004 | Williams et al. .............. 345/102 |
| 6,795,062 | B1 * | 9/2004 | Boursier ....................... 345/204 |
| 6,910,139 | B2 | 6/2005 | Ishidera |

(Continued)

FOREIGN PATENT DOCUMENTS

| CN | 1662870 | 8/2005 |
| CN | 101048810 | 10/2007 |

(Continued)

OTHER PUBLICATIONS

Office Action dated Jun. 20, 2013 (30 English translation), in Chinese Patent Application No. 201010208646.0, 7 pages.

(Continued)

*Primary Examiner* — Dmitriy Bolotin
(74) *Attorney, Agent, or Firm* — Blakely, Sokoloff, Taylor & Zafman LLP

(57) ABSTRACT

Power conservation for mobile device displays. An embodiment of a method includes generating display images for a display screen of a mobile device, and transitioning the mobile device to a reduced power consumption state. The reduced power consumption state includes reducing one or more illumination factors for the display screen; and reducing one or more animation factors for the display screen.

5 Claims, 5 Drawing Sheets

(56) References Cited

U.S. PATENT DOCUMENTS

| | | | |
|---|---|---|---|
| 6,973,333 B1 | 12/2005 | O'Neil | |
| 7,123,247 B2 | 10/2006 | Morita | |
| 7,190,338 B2 | 3/2007 | Kubota et al. | |
| 7,239,742 B2 | 7/2007 | Ohtani et al. | |
| 7,424,674 B1 | 9/2008 | Gross et al. | |
| 7,463,255 B2* | 12/2008 | Yang | 345/211 |
| 7,581,180 B2 | 8/2009 | Masui et al. | |
| 7,782,333 B2 | 8/2010 | Yamaguchi et al. | |
| 8,254,957 B2* | 8/2012 | Ferren et al. | 455/456.1 |
| 2002/0040442 A1* | 4/2002 | Ishidera | 713/300 |
| 2002/0119788 A1 | 8/2002 | Parupudi et al. | |
| 2002/0173295 A1 | 11/2002 | Nykanen et al. | |
| 2002/0180723 A1 | 12/2002 | Siwinski | |
| 2003/0126330 A1 | 7/2003 | Balasuriya | |
| 2003/0200481 A1 | 10/2003 | Stanley | |
| 2004/0203768 A1 | 10/2004 | Ylitalo et al. | |
| 2004/0257316 A1* | 12/2004 | Nguyen | 345/87 |
| 2005/0044423 A1 | 2/2005 | Mellmer et al. | |
| 2005/0110717 A1* | 5/2005 | Iwamura | 345/76 |
| 2005/0124389 A1* | 6/2005 | Yang | 455/574 |
| 2005/0283724 A1 | 12/2005 | Griffin | |
| 2006/0101293 A1 | 5/2006 | Chandley et al. | |
| 2006/0123081 A1 | 6/2006 | Baudino et al. | |
| 2006/0132474 A1 | 6/2006 | Lam | |
| 2006/0206733 A1 | 9/2006 | Ono | |
| 2006/0236144 A1 | 10/2006 | Chao | |
| 2006/0267972 A1* | 11/2006 | Yi | 345/211 |
| 2007/0004393 A1 | 1/2007 | Forsberg et al. | |
| 2007/0021108 A1 | 1/2007 | Bocking et al. | |
| 2007/0073725 A1 | 3/2007 | Klein, Jr. et al. | |
| 2007/0082712 A1 | 4/2007 | Ikeda et al. | |
| 2007/0226649 A1 | 9/2007 | Agmon | |
| 2008/0055318 A1* | 3/2008 | Glen | 345/501 |
| 2008/0220715 A1 | 9/2008 | Sinha et al. | |
| 2008/0243808 A1 | 10/2008 | Rieman et al. | |
| 2008/0253345 A1 | 10/2008 | Sanguinetti | |
| 2008/0261593 A1 | 10/2008 | Wong et al. | |
| 2008/0288955 A1 | 11/2008 | Brockway et al. | |
| 2009/0019131 A1 | 1/2009 | Ganesan | |
| 2009/0070030 A1 | 3/2009 | Isoda et al. | |
| 2009/0070606 A1 | 3/2009 | Chen et al. | |
| 2009/0138276 A1 | 5/2009 | Hayashida et al. | |
| 2009/0163226 A1 | 6/2009 | Karkaria et al. | |
| 2009/0165145 A1 | 6/2009 | Haapsaari et al. | |
| 2009/0286557 A1 | 11/2009 | Clipsham | |
| 2009/0322800 A1* | 12/2009 | Atkins | 345/690 |
| 2010/0062788 A1 | 3/2010 | Nagorniak | |
| 2010/0277512 A1* | 11/2010 | Shen et al. | 345/690 |
| 2010/0298048 A1 | 11/2010 | Yamazaki | |
| 2010/0318903 A1 | 12/2010 | Ferren | |
| 2011/0074765 A1* | 3/2011 | Oterhals et al. | 345/418 |
| 2011/0080419 A1* | 4/2011 | Croxford et al. | 345/531 |

FOREIGN PATENT DOCUMENTS

| | | |
|---|---|---|
| CN | 101303747 | 11/2008 |
| CN | 101447987 | 6/2009 |
| EP | 1217792 | 6/2002 |
| EP | 1204262 | 3/2004 |
| EP | 1445923 | 8/2004 |
| EP | 1737193 | 12/2006 |
| EP | 1903759 | 3/2008 |
| EP | 2076001 | 7/2009 |
| GB | 2373914 | 10/2002 |
| GB | 2397196 | 7/2004 |
| GB | 2421147 | 6/2006 |
| JP | 09-138716 | 5/1997 |
| JP | 2000-250455 | 9/2000 |
| JP | 2003-284138 | 10/2003 |
| JP | 2006-236159 | 9/2006 |
| JP | 2007-135006 | 5/2007 |
| JP | 2007-219835 | 8/2007 |
| JP | 2008-193546 | 8/2008 |
| JP | 2009-49564 | 3/2009 |
| JP | 2009-116459 | 5/2009 |
| JP | 2010011334 | 1/2010 |
| JP | 2010107784 | 5/2010 |
| KR | 10-2009-0038361 | 4/2009 |
| TW | 200638188 | 11/2006 |
| WO | WO01/97074 | 12/2001 |
| WO | WO03/009511 | 1/2003 |
| WO | WO03/088127 | 10/2003 |
| WO | WO-2005/101239 | 10/2005 |
| WO | WO-2007038281 | 4/2007 |
| WO | WO-2008/067261 | 6/2008 |
| WO | WO-2008/091479 | 7/2008 |
| WO | WO2010/133770 | 11/2010 |
| WO | WO-2010147610 | 12/2010 |

OTHER PUBLICATIONS

Second Office Action dated Apr. 24, 2013 (+ English translation), in Chinese Patent Application No. 201010206761.4, 20 pages.
Office Action dated Jun. 24, 2013 (+ English translation). in Chinese Patent Application No. 201010208688.4, 9 pages.
Non-final Office Action for United Kingdom Patent Application No. GB1009708.7 mailed Aug. 25, 2010.
Non-final Office Action for United Kingdom Patent Application No. GB1009714.5 mailed Aug. 18, 2010.
Combined Search Report and Examination Report for United Kingdom Patent Application 1009711.1 issued Sept 23, 2010, 10 pages.
First Office Action for German Patent Application No. 10 2010 023 692.6-31 mailed Mar. 18, 2011.
Non-Final Office Action for U.S. Appl. No. 12/646,837, Mailed Jun. 6, 2011, 12 pages.
Notice of Preliminary Rejection for Korean Patent Application No. 10-2010-57105, Mailed Jun. 23, 2011, 5 pages.
Non-Final Office Action for U.S. Appl. No. 12/646,658, Mailed Aug. 23, 2011, 16 pages.
Non-Final Office Action for U.S. Appl. No. 11/020,397, Mailed Sep. 11, 2007, 12 pages.
Final Office Action for U.S. Appl. No. 11/020,397, Mailed Jun. 30, 2008, 13 pages.
Non-final Office Action for United Kingdom Patent Application No. GB1009714.5 mailed Oct. 18, 2011.
First Office Action for German Patent Application No. 10 2010 023 691.8-31 mailed Oct. 27, 2011.
Office Action from UK1009708.7 mailed Jan. 9, 2012, 2 pages.
Office Action mailed Jun. 6, 2012, in U.S. Appl. No. 12/646,730, 20 pages.
First Official Action mailed Apr. 10, 2012 (+ English translation), in Japanese Patent Application No. 2010-135660, 6 pages.
Office Action mailed May 22, 2012 (+ English translation), in Japanese Patent Application No. 2010-135662, 6 pages.
Combined search and examination report mailed May 2, 2012, in Great Britain Patent Application No. GB1009714.5, 3 pages.
International Search Report and Written Opinion received for International Application No. PCT/US2009/069927, mailed Jul. 29, 2010, 7 pages.
Office Action mailed May 8, 2012 (+ English translation), in Japanese Patent Application No. 2010-135661, 9 pages.
Examination Report dated Jun. 14, 2012, in Great Britain Patent Application No. GB1009711.1, 3 pages.
Examination Report mailed Jan. 12, 2012, in Great Britain Patent Application No. GB1009711.1, 6 pages.
Notice of Preliminary Rejection dated Jul. 31, 2012 (+ English translation), in Korean Patent Application No. 10-2010-57267, 6 pages.
Office Action dated Jan. 10, 2013 (+ English translation), in Chinese Patent Application No. 201010208646.0, 23 pages.
Office Action dated Jan. 29, 2013 (+ English translation), in Japanese Patent Application No. 2010-135660, 4 pages.
Office Action dated Nov. 5, 2012 (+ English translation), in Chinese Patent Application No. 201010206761.4, 22 pages.
Office Action dated Oct. 9, 2012 (+ English translation), in Chinese Patent Application No. 201010208688.4, 14 pages.
Office Action mailed Apr. 24, 2012, in U.S. Appl. No. 13/376,618, 11 pages.

(56) References Cited

OTHER PUBLICATIONS

Translation of Decision of Refusal dated Dec. 18, 2012, in Japanese Patent Application No. 2010-135661, 3 pages.
Final Rejection Decision dated Aug. 29, 2013 (+ English translation), in Japanese Patent Application No. 2010-135660, 4 pages.
Official Action dated Aug. 12, 2013 (+ English translation), in German Patent Application No. 102010019637.1, 13 pages.
Notice of Third Office Action dated Nov. 28, 2013 (+ English translation), in Chinese Patent Application No. 201010208646.0, 7 pages.

* cited by examiner

POWER CONSERVATION FOR MOBILE DEVICE DISPLAYS

CROSS-REFERENCE TO RELATED APPLICATIONS

This application is a continuation of U.S. patent application Ser. No. 12/646,730, filed Dec. 23, 2009, and claims priority from U.S. Provisional Patent Application No. 61/187,520, filed Jun. 16, 2009, which applications are incorporated herein by reference in their entireties.

TECHNICAL FIELD

Embodiments of the invention generally relate to the field of electronic devices and, more particularly, to a method and apparatus for power conservation for mobile device displays.

BACKGROUND

Mobile devices, includes cellular phones, smart phones, personal digital computes, and other similar devices, are increasing used and relied up on for many different fields and endeavors as the devices become more powerful and flexible in operation. The very mobility and connectiveness of mobile devices allows the devices to operate as substitutes for larger computes, as well as performing communication and entertainment functions.

In addition to other attributes, the graphical abilities of the new devices has also become more powerful, allowing more elaborate visual displays for the users of such devices, including extensive animations.

However, the processing power and graphical display of a mobile device comes at a price of power consumption. The limited size of mobile devices limits power storage, and the mobility and varied utility of the devices often limits charging opportunities. Thus, devices may be extremely useful but the usefulness may be limited by power consumption.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
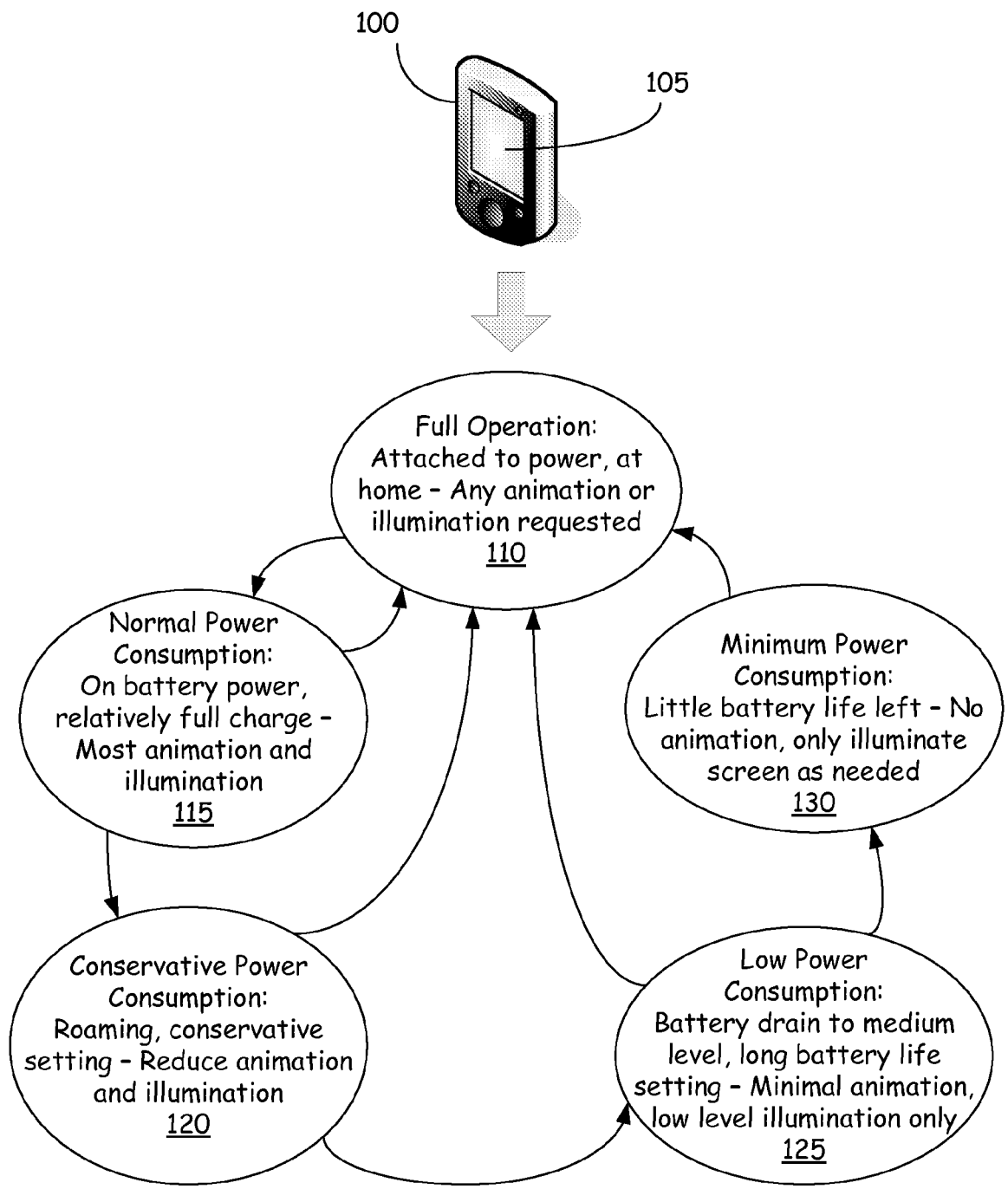
FIG. 1 is a state diagram of an embodiment of power management for a mobile device or system.

Embodiments of the invention are generally directed to power conservation for mobile device displays.

As used herein:

"Mobile device or system" means a mobile electronic device or system including a cellular telephone, smart phone, personal digital device, handheld computer.

In some embodiments, a mobile device or system reduces power consumption related to a display through an organized reduction in power consumption to minimize loss of user experience as power needs are reduced. In some embodiments, a mobile device or system will gradually reduce power consumption for the display as the situation warrants.

User interfaces for electronic devices, including mobile devices or systems, have become increasingly sophisticated and intricate. One aspect of this general trend is a move towards animated interfaces incorporating extensive video and rendered 3-D (three-dimensional) objects and environments. However, the processing power (and therefore electrical power draw) required to generate such animated interface elements may be substantial. While the processing power for complex animations is often available even in handheld devices, continued use of the processing power may lead to unacceptably short battery life.

In order to keep pace with the increasingly sophisticated functionality offered by mobile devices such as cell phones and PDAs, mobile device manufacturers may address certain power consumption behavior of their mobile devices. In such devices, screen savers are commonly used to reduce power consumption by displays during period of presumed inactivity. However, a screen saver approach provides only coarse management of power consumption, with the screen saver generally providing only two states in which either (1) the display draws full power and the user is provided full interaction with the display, or (2) the display draws much less power but the user is provided with no interaction with the display. In some embodiments, a mobile device or system instead provides a more finely grained response, acting to gradually reduce the power consumption related to the display of a mobile device or system by taking actions that include, but are not limited to, changing colors of items, changing colors of backgrounds, turning off certain sectors, eliminating pictures, reducing or eliminating animation, and reducing intensity of the display.

In some embodiments, a mobile device or system includes a power conservation or management feature or element. In some embodiments, the mobile device will slowly and selectively shut down one or more illumination and animated content factors based upon the relationship between the remaining battery level, core processes, and available CPU (central processing unit) cycles. Therefore, the user interface of the device will become less illuminated and less animated (such as still photos displayed instead of background videos, static icons instead of animated icons, and transitions between content screens becoming less graphically intensive) as battery life is reduced or as settings are changed.

In some embodiments, a mobile device or system will provide power consumption reduction that is based at least in part on the type of display screen contained in the mobile device. In some embodiments, a mobile device or system will include a display screen that allows for reduction in power consumption when the display screen is partially illuminated, and will utilize the display screen's characteristics to reduce power consumption. In some embodiments, a mobile device may include an OLED (organic light-emitting diode) display. Unlike mobile device technologies such as LCD (liquid crystal display) screens, an OLED display does not require a backlight to function. The operation of such a display without requiring the backlight may provide numerous advantages, including operation with lower power consumption.

In some embodiments, a mobile device or system, powered by a battery or other similar internal power source, provides a process or system for fractionally illuminating the display of a portable (battery powered) device on an as-needed basis. In some embodiments, a mobile device includes an OLED display screen, and, with such screen operating without requiring a backlight, it is thus possible to illuminate only certain portions of the screen, thus reducing overall power consumption. In some embodiments, the portion of the display that is illuminated is determined based at least in part on the content to be displayed. For example, if an incoming call is received, and the incoming phone number is to be displayed, a mobile device may illuminate only the portion of the display actually providing the incoming phone number, and thus the power associated with illuminating the complementary portion of the display is saved.

In some embodiments in which a different type of display screen is utilized, such as an LCD display, the backlight or background illumination for such display may be dimmed in the unused portion of the display. In one embodiment, a backlight of a mobile device display may be divided into sectors, with the backlight for the active sector being illuminated. For example, a display may be divided into left and right halves, and the left and right halves may be selectively illuminated based on the location of the cursor.

In some embodiments, a power management system for a mobile device, including one or more of a processor for the mobile device or a dedicated power manager element, provides for reducing the power draw associated with highly animated user interfaces on handheld devices. In some embodiments, the power management system tailors the animations to be displayed in a manner to draw reduced power for the particular display technology in use. For example, the power drawn by an OLED display may be minimized by incorporating red-, green-, or blue-on-black animations more frequently than white-on-black animations, and white-on-black animation more frequently than black-on-white and color-on-white animations, which are relatively very power intensive. In some embodiments, animations are carried out by a separate graphics processing unit (GPU) to minimize the cycling of the primary processor, or CPU (central processing unit).

Further, in some embodiments, the invention allows adjustment of a level of illumination and animation presented, such as specifying the level of display operations within a set of power management preferences. For example, a "roaming" power setting (where the user expects to be far from a charging source for an extended period of time) may specify a low level of animation to provide longer battery life. Conversely, an "at home" or "full power" power setting may specify full animation because of the ease of charging in the home environment. In some embodiments, a mobile device may also automatically adjust the level of animation based on knowledge of the current location of the device. In some embodiments, an adjustment of a level of animation may also be made via power setting definitions for the mobile device (such as by invoking the roaming setting based on the location of the device), directly in response to the measured battery charge (animation may be reduced if battery shortfall is imminent), or in response to the time of day (animation may, for example, be increased near the end of the day when imminent recharging is assumed). In some embodiments, a mobile device may adjust the amount of animation in a predictive manner, based on a desired battery life.

In some embodiments, animation may be reduced to a single icon or to a series of icons that may be cycled with minimal power draw. In an example, an element of a display may be a relatively complex animation that requires significant processor or video processor computation. In some embodiments, a mobile device may choose a single frame or element of the animation to generate a single icon to replace the animation. In some embodiments, the mobile device may recognize a pattern in the animation and may store a series of frames or still images of the animation to reflect a simplified version of the original animation. In some embodiments, the mobile device will store the series of frames of the animation in, for example, a set of registers, and the mobile device will replace the original animation with a sequence of the frames of the animation to generate a simplified, less power intensive animation.

FIG. 1 is a state diagram of an embodiment of power management for a mobile device or system. In this illustration, a mobile device 100 having one or more display screens 105 utilizes a plurality of different states to determine which illumination and animation power management processes to utilize. While certain states are described for illustration, embodiments are not limited to these states. Embodiments of mobile devices or systems may include different states or a different number of states.

In some embodiments, the states may include a full operation state 110, which may be entered when there are minimal concerns regarding power limitations. In some embodiments, the state may be employed when a mobile device is plugged into a power source, or, more specifically, when the mobile device is plugged into a power source and the battery level has risen above a certain level. In some embodiments, the mobile device may also be placed in the full operation state when, for example, the device is used in a home environment in which power sources are easily available for charging. In some embodiments, during the full operation state the mobile device imposes no limitations on illumination or animation, and all applications and processes may use full illumination and full animation. As illustrated, the mobile device may return to the full operation state from any other state upon being connected to a power source.

In some embodiments, the states may include a normal power consumption state 115, which may be entered when the mobile device is operating on battery power (not connected to an external power source) and has a relatively full battery charge, but, for example, is not located in a home environment. During such state, the mobile device may allow most animation and illumination, with only limitations to avoid very high power consumption. For example, the mobile device may not allow full display intensity at the normal consumption state.

In some embodiments, the states may include a conservative power consumption state 120, which may be entered when the device is in a "roaming" state and may not be near a power source, or when the device is set to the conservative power consumption state by the user. In such state, the mobile device may take action to reduce animation and illumination. For example, the mobile device may modify illumination colors to less power intensive choices, and may reduce the incidence of animation. In an example, the mobile device may detect that an animation is relatively repetitive, may store a certain number of frames of the animation, and may step through the frames rather than allowing the processor or video processor to generate the animation.

In some embodiments, the states include a low power consumption state 125, which may be entered when the battery has been drained to a medium level or the mobile device has been set to a long battery life setting. In such state, the mobile device may allow only minimal animation, possible replacing animation with still images. In addition only low level illumination is utilized, including for example only illumination backlighting as necessary, such as only illuminating certain sectors of the display.

In some embodiments, the states include a minimum power consumption state 130, which may be entered when there is little battery life left. In some state, the mobile device may eliminate all animation, use only low power colors, and only illuminate the display screen as needed to briefly show notifications and warnings.

Figure 2:
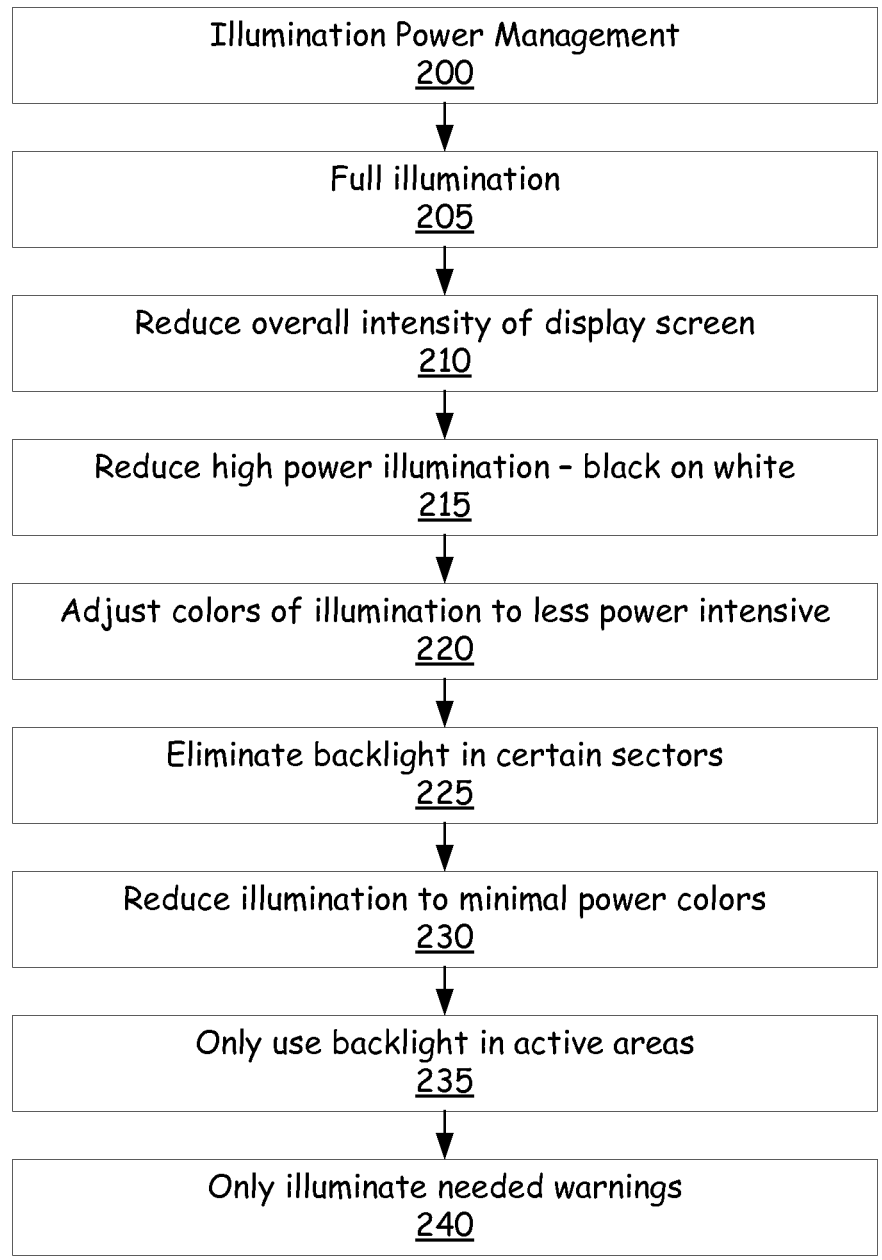
FIG. 2 is a flowchart to illustrate an embodiment of a process illumination power management for a mobile device or system.

FIG. 2 is a flowchart to illustrate an embodiment of a process illumination power management for a mobile device or system. In some embodiments, an illumination power management process 200 includes a series of measures to gradually reduce power consumption while minimizing the impact of the user of the mobile device. In some embodiments, the measures are implements in combinations with the measures illustrated in FIG. 3. While a certain series of measures is provided for illustration, embodiments are not limited to these measures or any particular order of implementation. In some embodiments, a mobile device may begin at full illumination 205, in which there are no power related limitations on illumination levels or colors. In some embodiments, the mobile device may then gradually impose power consumption restrictions by: reducing the overall intensity of the display screen 210; reducing high power illumination choices 215, including color combinations such as black on a white background; adjusting colors of illumination to less power intensive choices 220; eliminating backlighting in certain sectors of the display 225 so that the overall power consumption is reduced; further reducing illumination to color that utilize the least amount of power 230; using backlighting only in active areas of the display screen 235; and eliminate all illumination other that necessary notifications and warnings 240.

Figure 3:
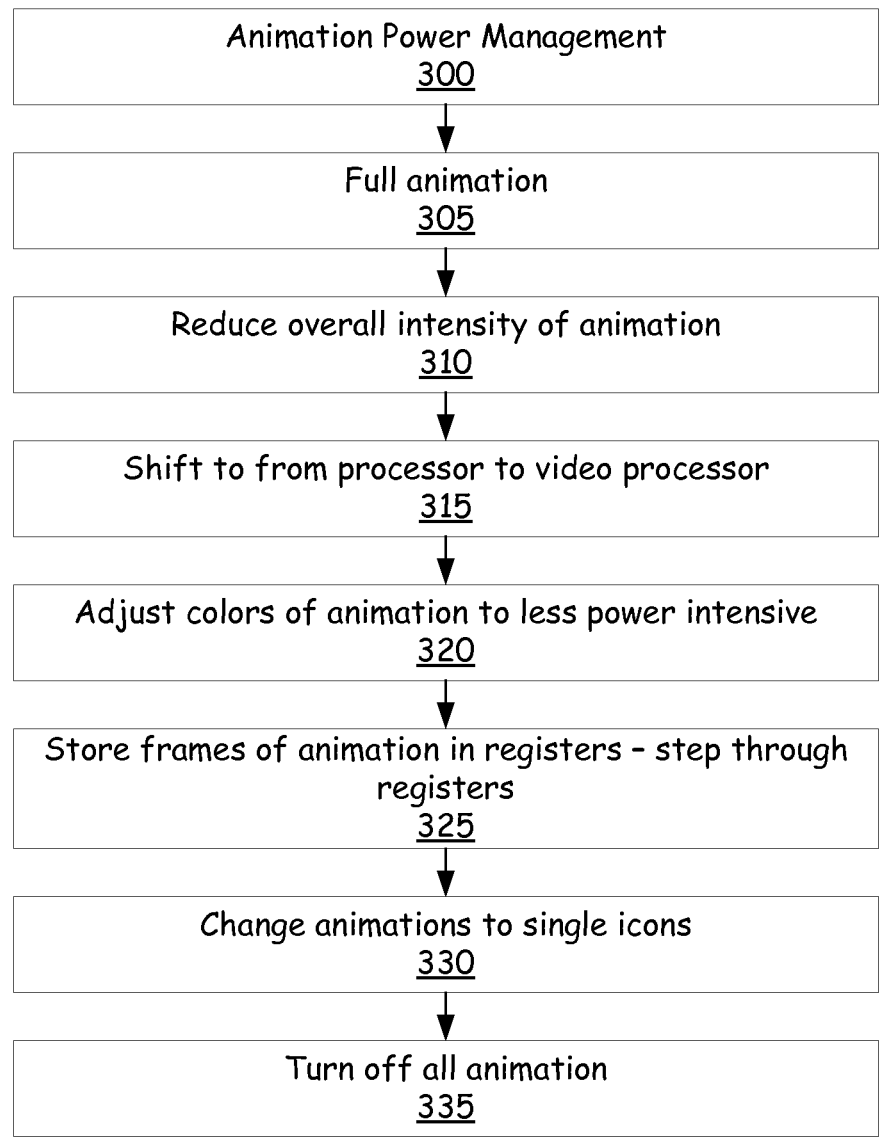
FIG. 3 is a flowchart to illustrate an embodiment of a process animation power management for a mobile device or system.

FIG. 3 is a flowchart to illustrate an embodiment of a process for animation power management for a mobile device or system. In some embodiments, an animation power management process 300 includes a series of measures to gradually reduce power consumption while minimizing the impact of the user of the mobile device. In some embodiments, the measures are implements in combinations with the measures illustrated in FIG. 2. While a certain series of measures is provided for illustration, embodiments are not limited to these measures or any particular order of implementation. In some embodiments, a mobile device may begin at full animation 305, in which there are no power related limitations on animations. In some embodiments, the mobile device may then gradually impose power consumption restrictions by: Reducing the overall intensity of the animations 310; if this not already done, shifting the processing of the animation from the CPU to a dedicated video processor 315; adjusting colors of animation to less power intensive colors 320; determining that certain animations are repetitive an storing a number of frames or images of the animation to be stepped through without requiring any processing 325; further limiting animations to single icons without animation 330; and turning off all animation 335.

Figure 4:
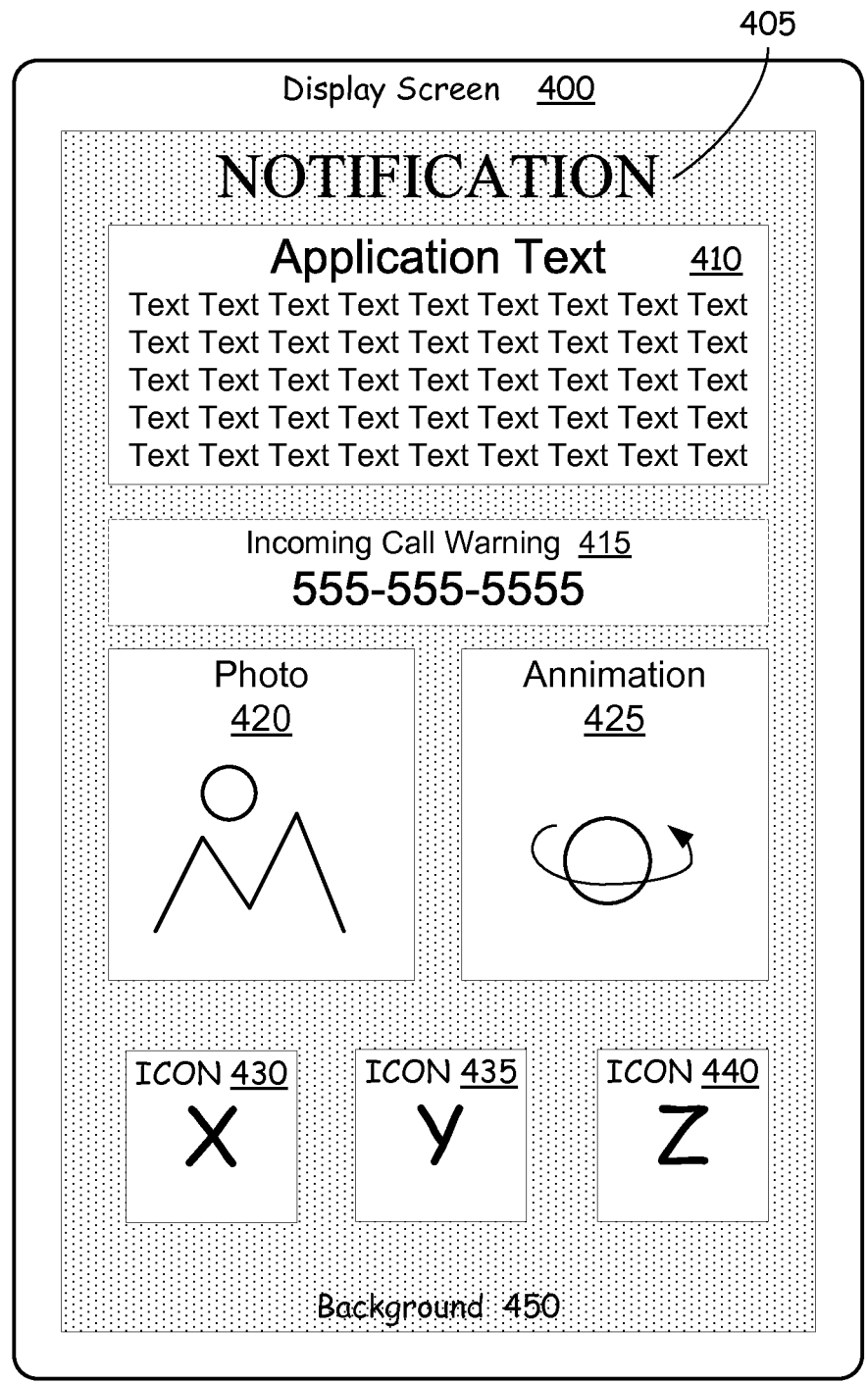
FIG. 4 is an illustration of a display screen for an embodiment of a mobile device or system.

FIG. 4 is an illustration of a display screen for an embodiment of a mobile device or system. In this illustration, the display screen 400 of a mobile device may include a location for one or more status 405, which in some embodiments may be shown only as necessary in the lowest power consumption state, such as, for example, only being illuminated as needed when a status changes. In some embodiments, the display screen 400 may include application text 410, which may be shown in a particular color combination. In some embodiments, the mobile device may modify the application text to use a less power consuming color as needed. In some embodiments, the display screen may include a warning, such as an incoming call warning 415. In some embodiments, the mobile device may reduce power to a minimal level by only showing the warnings with no other screen illumination, and only showing the warnings for a limited amount of time. In some embodiments, the display screen 400 may include one or more photos 420, which may be gradually changed in color or eliminated to reduce power consumption. Further, the display screen may included one or more larger animations 425 and one or more icons 430-440 that may be animated, which may be gradually reduced in power consumption by modifying colors, by changing animation to a series of still images that are stepped through to approximate the animation, and by substituting the animations with still images having no animations. The display screen 400 may also include a background illumination 450 (including a backlight for some display technologies), which may be modified to reduce power consumption, including changing colors of the background illumination, and turning off the background illumination in certain sectors of the display screen 405.

Figure 5:
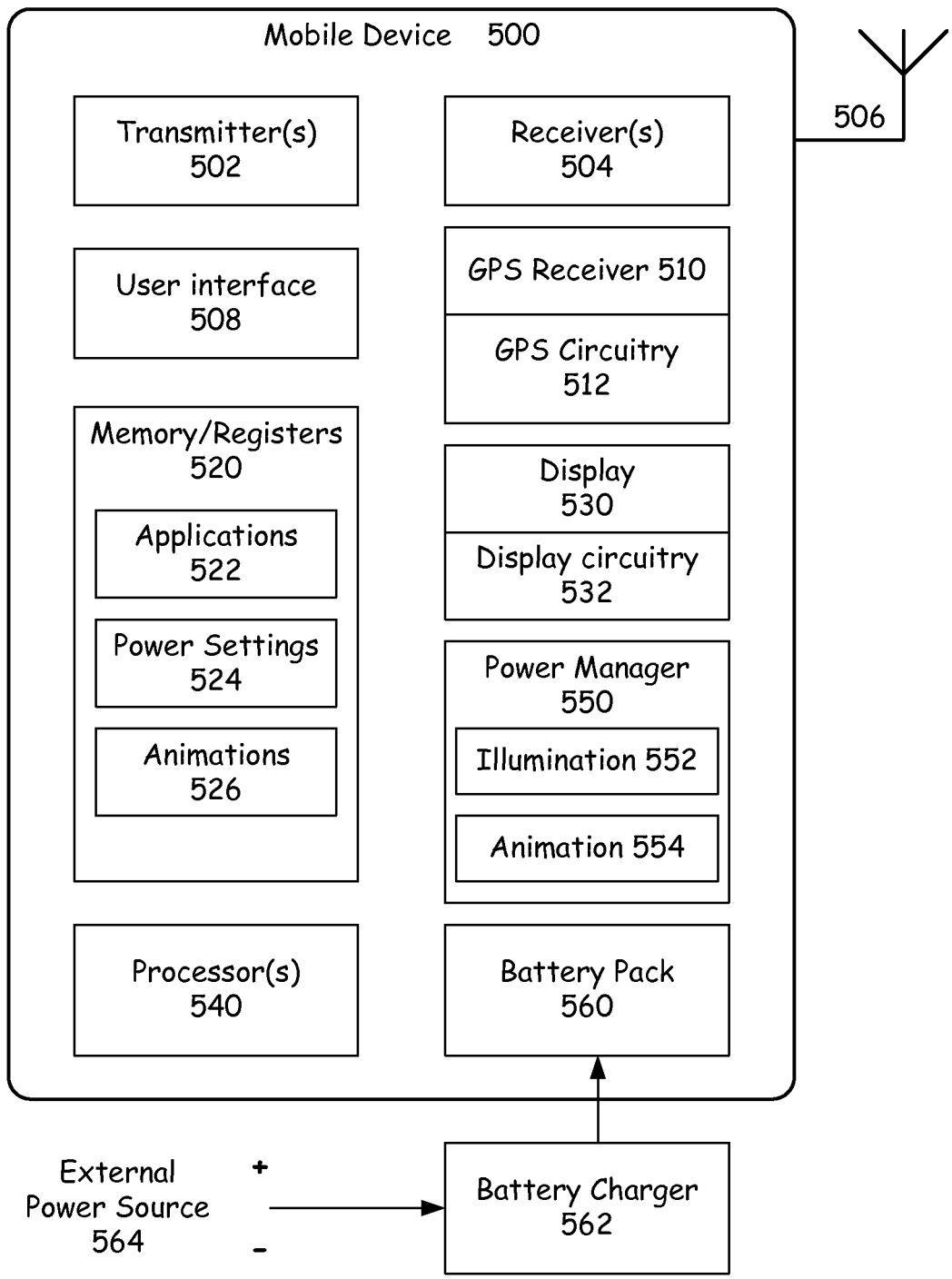
FIG. 5 illustrates an embodiment of a mobile device or system.

FIG. 5 illustrates an embodiment of a mobile device or system. In this illustration, a mobile device 500 includes elements for reduction of power consumption caused by a display screen of the device or system. In some embodiments, a mobile device 500 includes one or more transmitters 502 and receivers 504 for transmitting and receiving data. In some embodiments, the mobile device includes one or more antennas 506 for the transmission and reception of data, where the antennas may include dipole and monopole antennas. The mobile device 500 may further include a user interface 508, including, but not limited to, a graphical user interface (GUI), which may include the use of extensive animation. The mobile device 500 may further include one or more location determination elements for the determination of physical location, including, but limited to, a GPS receiver 510 and GPS circuitry 512. In some embodiments, the location determination elements may include network detection elements. The location determination elements may be used to determination location for power management of the mobile device 500, such as in determining when the device is in a home environment or when the device is roaming and may not be near an external power source.

The mobile device 500 may further include one or more memories or sets of registers 520, which may include non-volatile memory, such as flash memory, and other types of memory. The memory or registers 520 may include one or more applications 522, which may utilizes various applications, one or more power settings for the device 524, such as conservative power consumption and maximum batter life settings, and registers for the storage of images of animations 526 that may be used to replace processor intensive animations with a few images that are repeatedly cycled.

The mobile device 500 may include a display 530 and display circuitry 532, which may be addressed to reduce power consumption as needed. In some embodiments, the mobile device 500 may further include one or more processors 540 to execute instructions, including instructions regarding power consumption of the mobile device 500. In some embodiments, the mobile device 500 may include a power manager system or element 550, which may include a first power management portion or subsystem to reduce power consumption by limitation of illumination produced by the display 552 and a second power management portion or subsystem to reduce power consumption by limitation of animation produced by the display 554. The mobile device 500 further includes a battery pack 560 or other similar mobile power source, which may be connected to (or may contain) a battery charger 562 that is connected with an external power source 564, such as a standard household or automotive power outlet.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments of the present invention may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments of the present invention may be provided as a computer program product, which may include a computer-readable medium having stored thereon computer program instructions, which may be used to program a computer (or other electronic devices) for execution by one or more processors to perform a process according to the embodiments of the present invention. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

The invention claimed is:

1. A non-transitory computer-readable storage medium having stored thereon data representing sequences of instructions that, when executed by a processor, cause the processor to perform operations comprising:
   generating display images for a display screen of a mobile device, the display images including animation, the mobile device having a plurality of power consumption states for a user interface to control power consumption in the use of the mobile device, the power consumption states including a full operation state and a plurality of reduced power consumption states to reduce power consumed by the display screen by gradually imposing changes in illumination and animation as the mobile device is transitioned to different power consumption states in response to a device setting and in response to power limitations for the mobile device, each power consumption state including a combination of certain restrictions on illumination and certain restrictions on animation, a lower power consumption state having greater restrictions on illumination and greater restrictions on animation for the user interface than a higher power consumption state;
   transitioning the mobile device from a higher first power consumption state to a lower second power consumption state of the plurality of power consumption states in response to power limitations for the mobile device, wherein transitioning the mobile device from the first power consumption state to the second power consumption state includes:
      instituting one or more additional restrictions on screen illumination; and
      instituting one or more additional restrictions on animation.

2. The storage medium of claim 1, wherein the restrictions on animation and illumination provided by the plurality of power consumption states are based at least in part on a type of the display screen for the mobile device.

3. The storage medium of claim 1, wherein the plurality of power consumption states for the user interface include the following series of increasing restrictions on illumination for the display screen in the use of the mobile device:
   transitioning a background or foreground illumination to a color that requires less power than a previous color;

turning off a background illumination for the display screen, for a display screen having background illumination; and turning off one or more but less than all of a plurality of sectors of a background illumination for the display screen, for a display screen having background illumination, or turning off one or more but less than all of a plurality of sectors of the display screen, for a display screen not having background illumination.

4. The storage medium of claim 3, wherein the series of increasing restrictions on screen illumination further includes:

eliminating all illumination of the display screen other than certain notifications and warnings.

5. The storage medium of claim 1, wherein the plurality of power consumption states for the user interface include the following increasing restrictions on animation for the display screen in the use of the mobile device:

changing a color of the animation to a color that requires less power than a previous color;

capturing a series of still frames of the animation and replacing the animation with a sequence of the still frames; and capturing a single still frame of an animation and replacing the animation with the still frame.

* * * * *